(No Model.)

T. HEALY & T. H. KRAFT.
ROTARY STEAM DRIER.

No. 599,386.

5 Sheets—Sheet 1.

Patented Feb. 22, 1898.

Witnesses
E. B. Gilchrist
Ella E. Tilden

Inventors
Thomas Healy +
Theodore H. Kraft
G Lynch Dorr + Donnell
their Attorneys (No Model.) 5 Sheets—Sheet 2.
T. HEALY & T. H. KRAFT.
ROTARY STEAM DRIER.

No. 599,386. Patented Feb. 22, 1898.

Witnesses.
E. B. Gilchrist
Ella E. Tilden

Inventors
Thomas Healy &
Theodore H. Kraft
By Lynch Dour & Donnelly
Their Attorneys (No Model.) 5 Sheets—Sheet 3.
T. HEALY & T. H. KRAFT.
ROTARY STEAM DRIER.
No. 599,386. Patented Feb. 22, 1898.
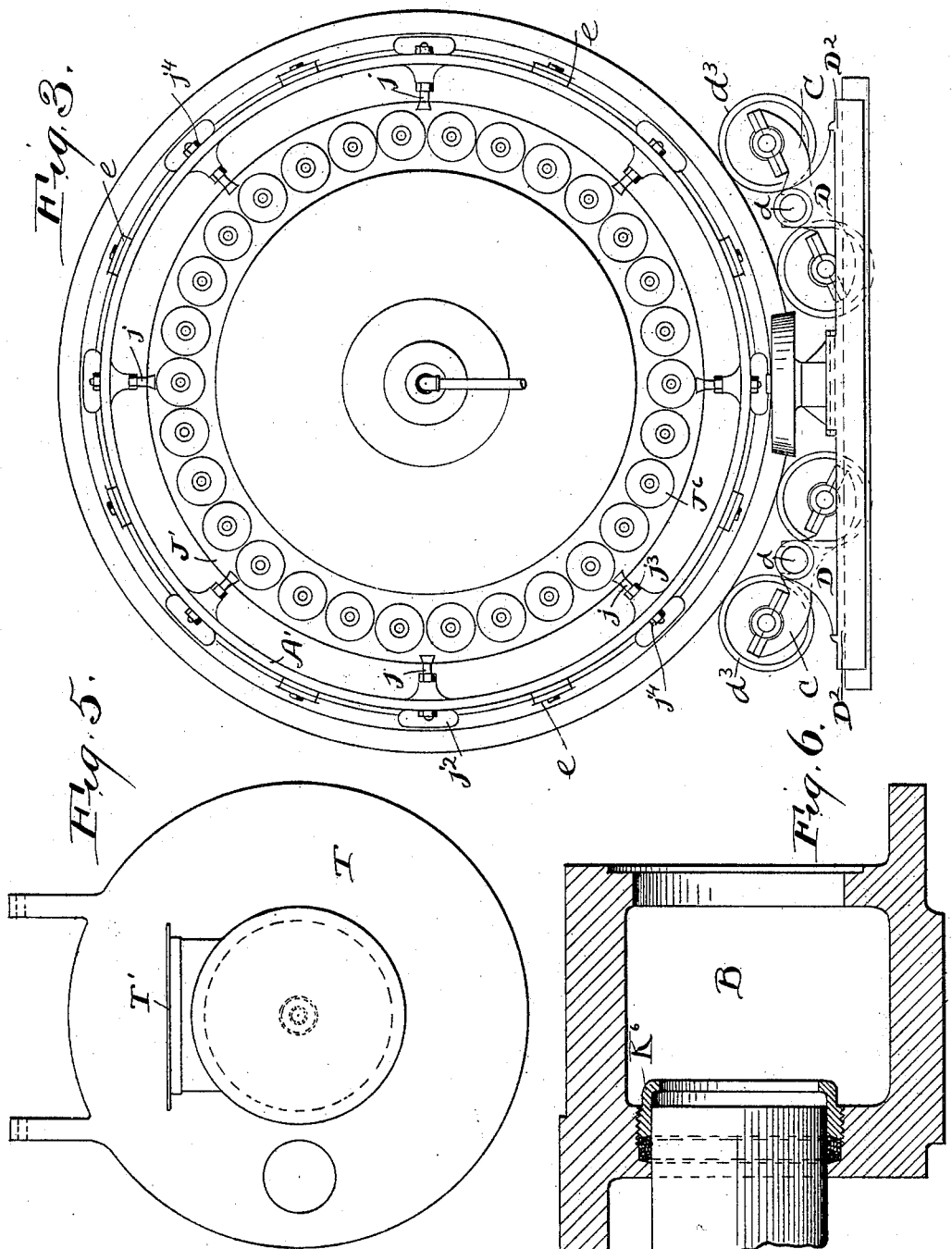

(No Model.) 5 Sheets—Sheet 4.
T. HEALY & T. H. KRAFT.
ROTARY STEAM DRIER.
No. 599,386. Patented Feb. 22, 1898.
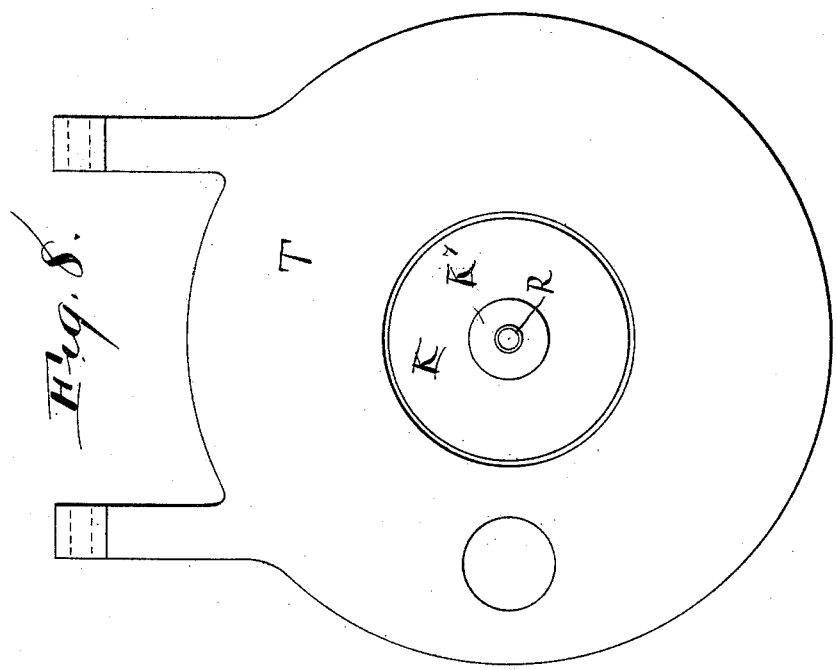
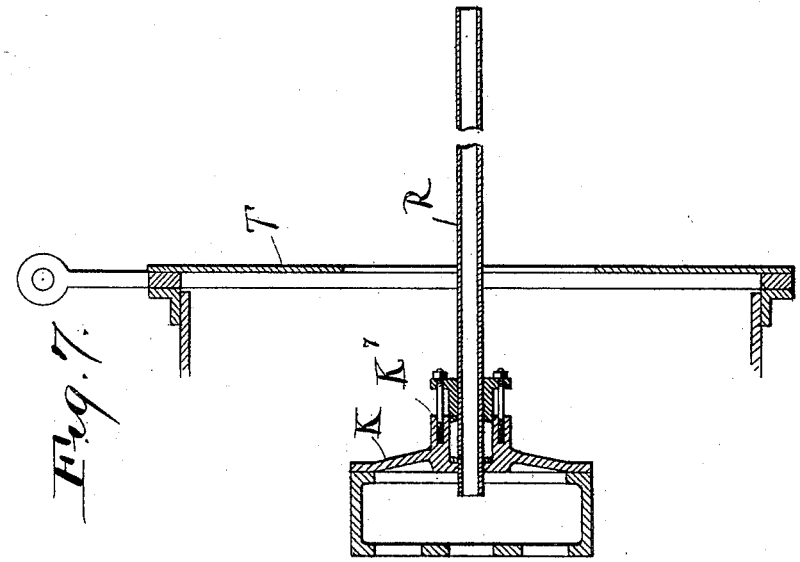
Witnesses.
E. B. Gilchrist
Ella E. Tilden
Inventors
Thomas Healy +
Theodore H. Kraft
By Lynch Dorr & Donnell
their Attorneys

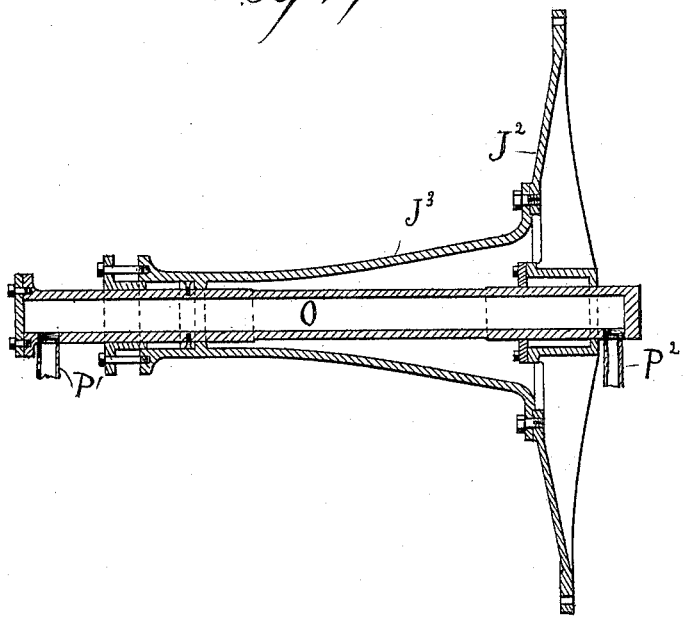

UNITED STATES PATENT OFFICE.

THOMAS HEALY AND THEODORE H. KRAFT, OF ROCKFORD, ILLINOIS.

ROTARY STEAM-DRIER.

SPECIFICATION forming part of Letters Patent No. 599,386, dated February 22, 1898.

Application filed July 10, 1896. Serial No. 598,641. (No model.)

*To all whom it may concern:*

Be it known that we, THOMAS HEALY and THEODORE H. KRAFT, of Rockford, in the county of Winnebago and State of Illinois, have invented certain new and useful Improvements in Rotary Steam-Driers; and we do hereby declare the following to be a full, clear, and exact description of the invention, such as will enable others skilled in the art to which it pertains to make and use the same.

Our invention relates to improvements in driers for drying feed, sugar, or any similar material.

Our invention consists in certain features of construction and combinations of parts, as will be hereinafter fully set forth and claimed.

Figure 1:
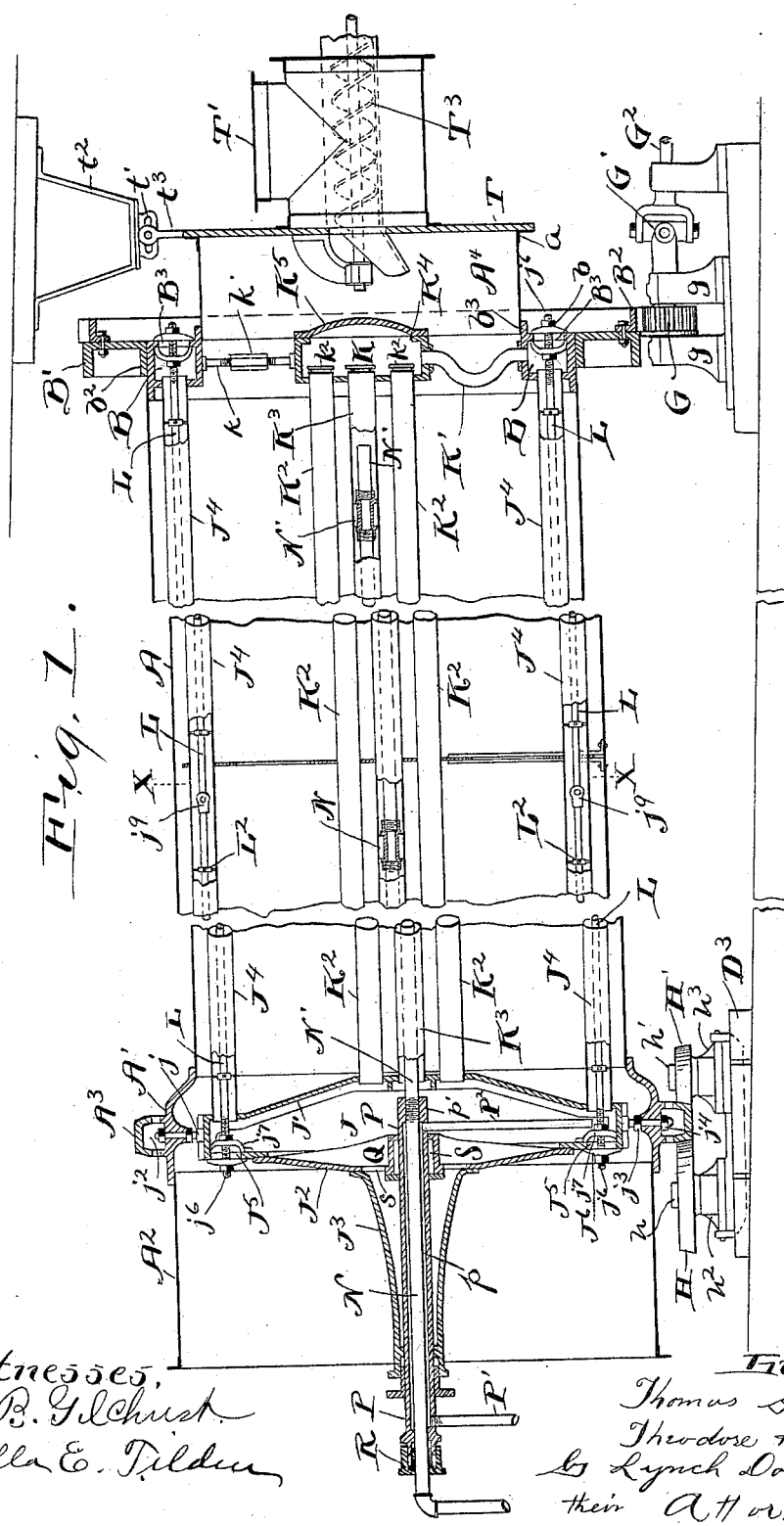
Figure 2:
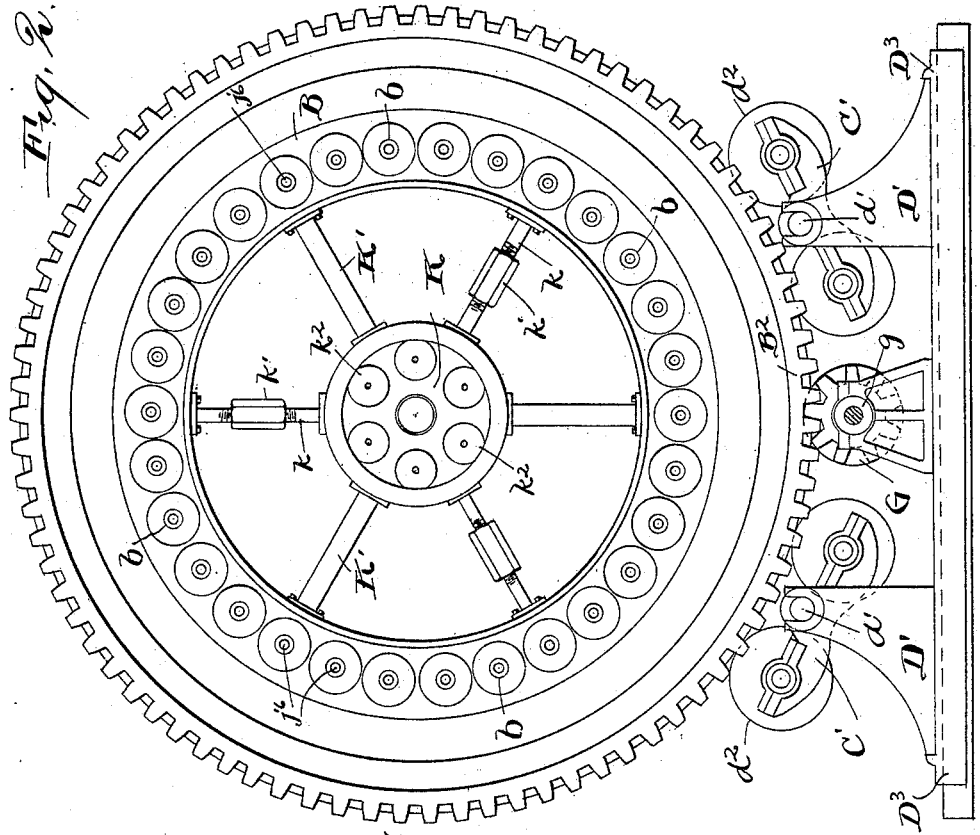
Figure 4:
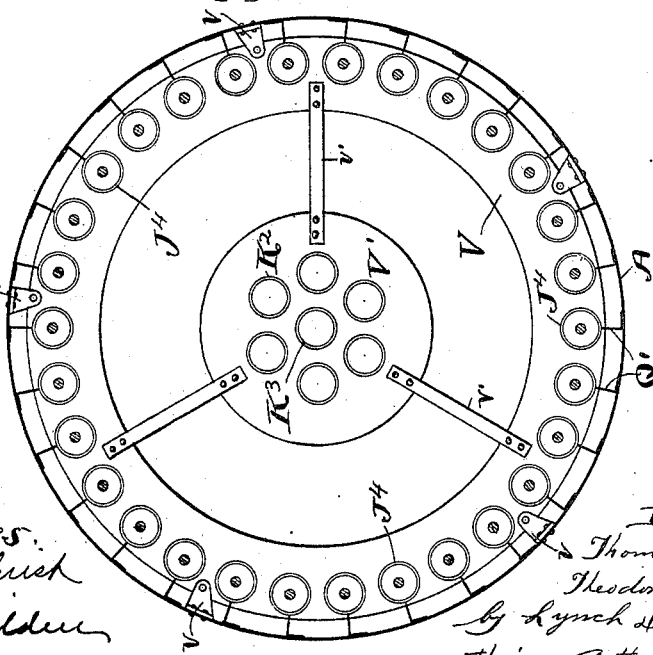

In the drawings, Figure 1 is a view in central sectional side elevation of a drier embodying our invention. In this figure both ends and the central portions of the drier are shown, and the portions between the ends and the central portion are not shown for the purpose of reducing the length of the drawing. Fig. 2 is a view in elevation of the high or feed end of the machine, showing said end with front plate and feed-chamber removed. Fig. 3 is a view in elevation of the low or delivering end of the drier. Fig. 4 is a section taken through line $x\,x$, Fig. 1, showing the arrangement of tube-supporting rings and also the angle-irons between the outer shell and the outer series of tubes. Fig. 5 is a view in elevation of the swinging door with feed-chamber and vapor-exit attached thereto. Fig. 6 illustrates the manner of securing the tubes to the respective heads or chambers. Figs. 7, 8, and 9 illustrate modified forms of construction of high and low end and door when it is desired to have the steam-feed pipe enter at the high end of the machine.

Referring to said drawings, A represents a cylindrical shell or casing which has its axis placed sloping somewhat out of the horizontal. The raised or feed end of said casing A is suitably attached to the outer surface of an annular tube head or chamber B, and at the lower end cylinder A is secured to a cast-metal ring A', and an enlarged cylinder $A^2$ is attached by means of ring A' at the said lower end.

$A^3$ B' represent tires which fit onto and are securely attached, respectively, to the outer surface of intermediate cylinder or ring A' and tube-chamber B. The peripheries of the tires are adapted to roll upon friction-rollers $d^3\,d^3\,d^2\,d^2$. The method whereby we prefer to attach tire $A^3$ to intermediate cylinder or ring A' is shown clearly in Fig. 3. Lugs $e$ are arranged at suitable intervals around said tire, through which bolts pass and are screwed into ring or cylinder A'. Tire B' is secured to tube-chamber B by any suitable fastening means to the inner flange $b^2$. The friction-rollers $d^2\,d^2\,d^3\,d^3$ have their shafts journaled in cradles C C', having centrally-placed shafts $d\,d'$, carried by standards D D', which are suitably bolted to their respective bed-plates $D^2\,D^3$.

Any longitudinal motion of the cylinder A is prevented by suitable thrust-rollers H H', which roll against either side of tire $A^3$ and revolve about vertical shafts $h\,h'$, carried by suitable standards $h^2\,h^3$, which are suitably bolted to bed-plate $D^3$.

$B^2$ represents an annular spur-wheel which is suitably attached to the outer side of tire B' in such a position that it will revolve truly with cylinder A.

G represents a pinion-wheel which gears with spur-wheel $B^2$ and has its shaft supported by suitable bearings $g\,g$. It will be observed that as cylinder A is inclined from the horizontal the spur-wheel $B^2$ will not be vertical, and it would therefore be necessary to miter both spur-wheel $B^2$ and pinion-wheel G if the shaft of gear-wheel G is to be horizontal. In order to obviate the necessity of this, we have introduced a universal coupling G', whereby the inclined shaft of gear-wheel G is connected to any suitable horizontal driving-shaft $G^2$.

J' represents the main casing of a cylindrical tube-chamber J common to both sets of tubes, which is supported axially within the intermediate cylinder A' by means of bolts $j$. Said bolts $j$ have V-shaped heads which fit into corresponding V-shaped slots cut in a longitudinal direction upon the outer horizontal surface of casing J' and which pass through intermediate cylinder A' into the recesses $j^2$, formed in tire $A^3$, being held in position by means of nuts $j^3$ and lock-nuts $j^4$. By this method of construction said tube-chamber J will be capable of moving in a longitudinal direction, whereby the expansion of the heating-tubes connected therewith will be allowed for, if necessary. It will also be observed that by placing tube-chamber J within the enlarged portion of cylinder A it can be increased in diameter without closing up said cylinder, and by so enlarging said tube-chamber tubes communicating therewith may be run very close to the inner surface of said cylinder, whereby a special form of construction, hereinafter described, may be conveniently carried out.

K represents another cylindrical tube-chamber, which is arranged axially within annular chamber B and is supported by means of supporting-rods $k$, which are flanged at each end and suitably attached by means of bolts passing through said flanges to the inner ring of annular tube-chamber B and the outer surface of tube-chamber K. Said rods $k$ are divided at their centers and have their ends screwed in opposite directions and connected together by means of nuts $k'$.

K' represents tubes communicating at their respective ends with tube-chambers B and K. Said tubes are preferably curved, as shown, so that they will be able to expand freely without causing rupture at their joints.

$J^4$ $J^4$ represent a series of heating-tubes extending from tube-chamber B to tube-chamber J in a parallel direction with cylinder A and so as to form a circle around the same.

$K^2$ represents another circular row of heating-tubes extending from tube-chamber K to chamber J, and $K^3$ an axially-arranged tube also extending from chamber K to chamber J. The ends of the tubes in row $K^2$ $K^2$ which terminate in tube-chamber K are partially closed by plugs $k^2$, the object of which will hereinafter be explained.

$K^4$ $J^5$ $B^3$ represent openings formed in the respective casings of tube-chambers K, J, and B, opposite to the ends of the tubes which terminate therein, whereby access is obtained to the same for cleaning, repairing, or other purposes. $J^6$ represent covers for said openings $J^5$ in casing $J'$, which are held in position by means of supporting-bolts $j^6$ and bridges $j^7$. $K^5$ represents a cover for the opening $K^4$, which is held in position by any suitable means.

L L represent stay-rods which pass through tubes $J^4$ $J^4$. The ends of said stay-rods which terminate in tube-chamber J are attached to the heads of bolts $j^6$ of cover $J^6$ by means of knuckle-joints $j^9$, and the other ends of bolts $j^6$ pass through holes in covers $B^4$ in the casing of tube-chamber B and are threaded for nuts $b$, whereby the stay-rods may be screwed up tight and said covers $B^4$ held in position.

$L^2$ represents spider or star shaped supports, whereby said stay-rods L L are prevented from sagging in tubes $J^4$ $J^4$.

N N' represent an axially-arranged steam-pipe which passes through tube-chamber J and nearly through the axially-arranged tube $K^3$. P represents a casing of larger internal diameter than said steam-pipe N, which surrounds the same at its lower end and also passes into tube-chamber J. The annular chamber $p$ thus formed around steam-pipe N is closed at its outer end by a stuffing-box R and at the end within tube-chamber J by a portion of reduced diameter $p'$, into which the two portions N N' of said steam-pipe are screwed and thus made continuous with one another.

$J^2$ represents an annular axially-arranged cover which partly closes a corresponding opening formed in the casing $J'$ of tube-chamber J opposite to tubes $K^2$ $K^2$ $K^3$ and which is detachably attached to said casing $J'$ by suitable means. The opening in said annular cover $J^2$ is also axially arranged and is also closed by a suitable cover $J^3$. Q represents a stuffing-box formed around an opening in said cover $J^2$, through which the aforementioned casing P passes.

$P^2$ represents a pipe which communicates with the lower portion of tube-chamber J and the inner end of annular chamber $p$, and P' an exhaust-pipe communicating with the outer end of said annular chamber $p$.

N" represent suitable antifriction-bearings formed about said steam-pipe N within tube $K^3$, whereby the friction produced when said tube revolves about said steam-pipe is reduced to a minimum, and S represents an antifriction-bearing which is supported from cover $J^2$ by means of webs $s$, whereby casing P is supported within tube-chamber J.

In order to form compartments about the interior of cylinder A, so that the material which is to be dried therein may be properly agitated, we close up the spaces between tubes $J^4$ $J^4$ and casing A by means of angle-irons Q', which have one of their sides suitably attached to casing A and the others extending to and against said tubes. Said angle-irons also form the means of stiffening cylinder A and thus enabling its length to be increased, with the result of a more economical use of the steam which is used as a heating agent in the apparatus.

In order to prevent the tubes contained in cylinder A from sagging, we have introduced a centrally-placed vertical stay-plate, the construction of which is plainly shown in Fig. 4. An annular plate V, through which each of the tubes in row $J^4$ $J^4$ passes, is supported from casing A by means of supporting-plates $v$, and a circular plate V', through which each of the tubes in row $K^2$ $K^2$ and the central tube $K^3$ passes, is supported from annular plate V by means of supporting-bars $v'$. Although we have only shown one of said vertical stay-plates, we do not restrict ourselves to this number, as it is obvious that more might in certain cases be used with advantage.

$A^4$ represents a cylindrical casing suitably attached to the inner side of a flange $b^3$, formed around and continuous with the inner ring or annular tube-chamber B, whereby a feeding-chamber is formed into which the material to be dried is delivered before passing into the drying-cylinder A. An angle-iron $a$ is passed around the outer end of said casing A⁴ and is suitably attached thereto, whereby a flange is formed against which a circular door T lies. Said circular door T is supported from above by means of arms t³ and a bearing t', which is slotted in a longitudinal direction, whereby said door is enabled to adjust itself properly to lie stationary upon said flange while it revolves about the same. Said bearing t is suitably attached to a hanger t², which is bolted or otherwise attached to any suitable support.

T' represents a vapor-exit pipe which communicates through door T with cylinder A⁴, and T³ a feeding arrangement which may be of any suitable form placed on one side of said door T, whereby the material to be dried may be continuously fed in proper quantities into said cylinder A⁴.

The aforementioned cylinder is made of such a length that the dried material may be discharged clear over thrust-roller H into any suitable receiving vessel.

Having now given a general description of our improved apparatus, we will proceed to explain the operation of the same.

Steam passes up steam-supply pipe N N' into tube-chamber K. As before stated, the ends of tubes K² K² are partially plugged. The size of the openings remaining is such that only a portion of the steam will pass through said tubes to tube-chamber J, the remainder circulating through connecting-tubes K' K' into annular tube-chamber B and from thence through tube-chambers J⁴ J⁴ into tube-chamber J. Condensed water is removed from chamber J through pipe P², annular chamber p, and discharge-pipe P'. Casing A is revolved by means of driving-shaft G², as before described. The sugar or other material to be dried is delivered into the feeding-cylinder A⁴ by means of the feeding arrangement T³, from whence it works by gravity into the heating-cylinder A, where it first comes in contact with the outer row of tubes J⁴ J⁴, and is carried around in the compartments formed by said tubes and angle-irons Q' until said compartments reach a certain point, when the material will be tipped out onto the central row of tubes K² K², from whence it falls into the compartments which are below to be again raised and thrown onto tubes K² K². This process will go continuously on until the material working gradually downward under the influence of gravity passes in cylinder A' and is finally discharged into any suitable receptacle.

We have shown in Fig. 6 our preferred method of securing the tubes J⁴ or K² to their respective heads or chambers, and this consists in providing each tube with a stuffing-box, through which it passes at one end. The stuffing-box forms part of the material of the respective chamber or head and is provided with an annular follower K⁶, having an inturned flange which is slotted to engage a tool for screwing it home or in place.

In Figs. 7, 8, and 9 we have illustrated a construction wherein the steam-feed pipe enters the drier at its high or feed end. In this construction we have shown the steam-pipe R entering the head K through a stuffing-box K⁷ and stopping short in head or chamber K. The central tube K³ should be plugged the same as tubes K², and the exhaust-tube O, Fig. 9, takes the place of the annular space p and is capped or closed at both ends with pipes P' and P², connected to it, as shown in Fig. 9.

What we claim is—

1. The combination with an inclined rotating cylinder, of a heating system consisting of suitable tube-chambers, placed at each end of said cylinder, a row of tubes arranged around said casing, an axially-arranged steam-pipe passing substantially through the cylinder, an axially-arranged tube surrounding the major portion of said steam-pipe, angle-irons or their equivalents arranged substantially as shown, whereby compartments are formed around said casing, and a vertical stay-plate, or vertical stay-plates adapted to support said tubes, substantially as shown and described.

2. The combination with an inclined rotating cylinder, of a heating system consisting of suitable tube-chambers, placed at each end of said cylinder, a row of tubes arranged around said casing, a group of tubes arranged within said row of tubes, an axially-arranged steam-pipe passing substantially through the cylinder and nearly through an axially-arranged tube, which latter surrounds the major portion of said steam-pipe, and angle-irons or their equivalents arranged substantially as shown, whereby compartments are formed around said cylinder, substantially as shown and described.

3. A rotary drier, comprising an inclined rotating cylinder A having portions A' and A² of increased diameter, tube-chambers K and J at each end of the cylinder, the chamber J being suspended within the increased-diameter portion of the cylinder, a row of tubes arranged around said cylinder, a centrally-arranged group of tubes, an axially-arranged steam-pipe, a condensed-water exit, angle-irons or their equivalents arranged substantially as shown, whereby compartments are formed around said cylinder, and a vertical stay-plate or stay-plates, adapted to support said tubes, substantially as described and for the purposes set forth.

4. A rotary drier, comprising an inclined rotating cylinder A having a portion of its lower end of increased diameter, an annular tube-chamber B, attached to one end of said cylinder, a cylindrical tube-chamber K of smaller diameter than said cylinder, also at one end of same and communicating with said annular chamber B by means of suitable pipes, a tubular chamber J supported within said increased-diameter portion of the cylinder, whereby it is permitted to move in a longitudinal direction, a row of tubes arranged around said cylinder and extending between tube-chambers J and B, an inner group of tubes $K^2 K^2$ extending between tube-chambers K and J having their ends, which terminate in chamber K, restricted in diameter, an axially-arranged tube $K^3$, also extending between chambers J and K, an axially-arranged steam-pipe passing through tube $K^3$ and to or about to the end of said tube, a casing P passing through a stuffing-box into tube-chamber J, whereby an annular chamber such as $p$ is formed around said steam-pipe, which is closed at its outer end by a stuffing-box, and within tube-chamber J by a portion which closely embraces said steam-pipe, a pipe communicating with the lower portion of the tube-chamber J, and the inner end of an annular chamber $p$, and an exhaust-pipe communicating with outer end of said chamber $p$, an antifriction-bearing, supporting said casing P within tube-chamber J, a suitable number of antifriction-bearings supporting said steam-pipe within axial tube $K^3$, cleaning-holes, doors and stay-rods, arranged substantially as shown, whereby compartments are formed around said cylinder, substantially as and for the purposes described.

5. A rotary drier, comprising an inclined rotating cylinder A having a portion of its lower end of increased diameter, an annular tube-chamber B attached to one end of said cylinder, a cylindrical tube-chamber K of smaller diameter than said cylinder, also arranged at one end of the same and supported in a suitable manner, and communicating with chamber B by means of suitable connecting-pipes, a tube-chamber J supported within that portion of the cylinder having an increased diameter, whereby it is permitted to move in a longitudinal direction, an outer row and an inner group of tubes, the ends of said tubes terminating in chambers K and J respectively, an axially-arranged tube $K^3$ extending between chambers J and K, an axially-arranged steam-pipe passing through tube $K^3$, a casing P passing through a stuffing-box into tube-chamber J, whereby an annular chamber such as $p$ is formed around said steam-pipe, a pipe communicating with the lower portion of tube-chamber J, and the inner end of annular chamber $p$, and an exhaust-pipe communicating with outer end of said chamber $p$, an antifriction-bearing supporting the casing P within tube-chamber J, a suitable number of antifriction-bearings supporting said steam-pipe within the axial tube $K^3$, cleaning-holes, doors and stay-rods, all arranged substantially as shown and described and for the purposes set forth.

6. In a rotary drier, the combination with an inclined cylinder and cast-metal cylinder or ring, the latter constituting an enlarged portion, said inclined cylinder and cast-metal cylinder or ring revolving upon suitable friction-rollers, of a bevel-tire integral with said metal cylinder or ring, a tire secured to the outer surface or periphery of the tube-chamber at the forward end of the drier, and an annular spur-wheel secured to the outer or front face of the last-named tire, substantially as shown and described.

7. In a rotary drier, the combination with an inclined rotating cylinder, such as A, and a supplemental cylinder $A^4$, of a door suspended substantially in the manner shown whereby it is enabled to lie against the end of said cylinder, substantially as and for the purposes set forth.

8. In a rotary drier, the combination with an inclined rotary cylinder, of tube-chambers arranged at each end of said cylinder, a group or groups of tubes extending between said tube-chambers, one of said tubes being axially arranged, an axially-arranged steam-pipe passing through lower tube-chamber and to or about to the end of axially-arranged tube, a casing of larger internal diameter than said steam-pipe surrounding the same, and passing through a stuffing-box into said lower tube-chamber, whereby an annular chamber is formed around said steam-pipe, which is closed at its outer end by a stuffing-box and within tube-chamber J, by a portion which closely embraces said steam-pipe, a pipe communicating with the lower portion of said tube-chamber and inner end of annular chamber and of an exhaust-pipe communicating with the outer end of said annular chamber, substantially for the purposes specified.

9. In a rotary drier, the combination with an inclined rotary cylinder, of tube-chambers arranged at each end of said cylinder, a group or groups of tubes extending between said tube-chambers, one of said tubes being axially arranged, an axially-arranged steam-pipe passing through lower tube-chamber and to or about to the end of axially-arranged tube, a casing of larger internal diameter than said steam-pipe surrounding the same, and passing through a stuffing-box into said lower tube-chamber, whereby an annular chamber is formed around said steam-pipe, which is closed at its outer end by a stuffing-box and within tube-chamber J, by a portion which closely embraces said steam-pipe, a pipe communicating with the lower portion of said tube-chamber and inner end of annular chamber, of an exhaust-pipe communicating with the outer end of said annular chamber and of a suitable number of antifriction-bearings arranged about said steam-pipe within said axial tube, substantially for the purpose specified.

10. In a rotary drier, the combination with an inclined rotary cylinder, of tube-chambers arranged at each end of said cylinder, a group or groups of tubes extending between said tube-chambers, one of said tubes being axially arranged, an axially-arranged steam-pipe passing through lower tube-chamber and to or about to the end of axially-arranged tube, a casing of larger internal diameter than said steam-pipe surrounding the same, and passing through a stuffing-box into said lower tube-chamber, whereby an annular chamber is formed around said steam-pipe, which is closed at its outer end by a stuffing-box and within tube-chamber J, by a portion which closely embraces said steam-pipe, a pipe communicating with the lower portion of said tube-chamber and inner end of annular chamber and of an exhaust-pipe communicating with the outer end of said annular chamber, of a suitable number of antifriction-bearings arranged about said steam-pipes within said axial tube and of an antifriction-bearing supporting said casing within said lower tube-chamber, substantially for the purposes specified.

11. In a rotary drier, an inclined rotary cylinder A, having an intermediate portion A' of increased diameter, and an end portion A² of greater diameter than the cylinder A, substantially as described and for the purposes set forth.

12. In a rotary drier, the combination with an inclined rotating cylinder, having a portion of its lower end of increased diameter, of a tube-chamber suspended within the increased-diameter portion of the chamber, and means for supporting said tube-chamber so that the same is capable of movement in a longitudinal direction, substantially as shown and described and for the purposes set forth.

13. In a rotary drier, the combination with a rotary cylinder and an inner group and outer group of tubes, of a stay or supporting plate for the outer tubes, consisting of an outer annular plate through which each of the tubes in the outer group passes, means for supporting said annular plate from the inner periphery of the cylinder, and an inner annular plate through which each of the tubes in the inner group passes, said inner plate being supported by means connected to the inner end of said outer annular plate, substantially as and for the purposes specified.

In testimony whereof we sign this specification, in the presence of two witnesses, this 24th day of June, 1896.

THOMAS HEALY.
THEODORE H. KRAFT.

Witnesses:
S. H. PAXTON,
GUS F. SMITH.